United States Patent [19]

Menzel

[11] 3,827,155

[45] Aug. 6, 1974

[54] METHOD AND APPARATUS FOR LAYING A PIPLINE

[75] Inventor: Ramon Menzel, Stow, Mass.

[73] Assignee: Laser Alignment, Inc., Grand Rapids, Mich.

[22] Filed: July 27, 1972

[21] Appl. No.: 275,687

[52] U.S. Cl. .................................. 33/228, 33/286
[51] Int. Cl. .......................................... G01b 11/27
[58] Field of Search ............ 98/49, 50; 33/228, 275, 33/286, 293, 294, 295, 296; 356/128, 241; 350/179, 63; 250/227

[56] References Cited
UNITED STATES PATENTS

| | | | |
|---|---|---|---|
| 2,187,908 | 1/1940 | McCreary | 250/217 |
| 2,796,822 | 6/1957 | Nikolajevic | 98/94 |
| 3,116,557 | 1/1964 | Trice | 33/228 |
| 3,279,070 | 10/1966 | Blount et al. | 33/275 R |
| 3,413,059 | 11/1968 | Berreman | 350/179 |
| 3,415,588 | 12/1968 | Berreman | 350/179 |

Primary Examiner—Louis R. Prince
Assistant Examiner—Charles E. Phillips
Attorney, Agent, or Firm—Price, Heneveld, Huizenga & Cooper

[57] ABSTRACT

This disclosure describes a method and apparatus for laying a pipeline in which the pipes are aligned along a preselected path with a collimated light beam, preferably according to the methods of U.S. Pat. Nos. 3,116,557 and 3,279,070. Air is forced through the pipeline in a helical spiral to prevent gases from building up within the pipeline as the pipes are being laid. A blower unit coupled to an outlet nozzle having a clamp for clamping the nozzle to the pipe at an angle to the longitudinal axis of the pipe is provided for this purpose.

14 Claims, 5 Drawing Figures

METHOD AND APPARATUS FOR LAYING A PIPLINE

BACKGROUND OF THE INVENTION

This invention relates to laying of a pipeline. In one of its aspects, it relates to a method of laying pipes in which a collimated light beam such as a laser beam is projected co-axially through the pipes, wherein air is moved through the pipeline in a helical spiral to prevent the build up of refracting gases within the pipeline.

In another of its aspects, the invention relates to an apparatus for laying a pipeline, the system having a collimated light source for projecting a collimated light beam co-axially of a pipeline, a target means coupled on the end of the last pipe to align the end of the pipe with the collimated light beam, and blower means with an output nozzle are provided for moving air through the pipeline in a helical spiral to prevent deleterious build up of gases within the pipe.

In U. S. Pat. Nos. 3,116,557 and 3,279,070 there are disclosed methods for laying a pipeline with the use of a collimated light beam which is aligned along a preselected path for the pipeline. The last pipe in the line has a target coupled to the end. The pipe is moved until the target is aligned with the collimated beam and the pipe is then fixed in place. The pipeline is extended by inserting one end of another pipe into the end of the aligned pipe and aligning the other end with a target in the same manner as the previous pipe. The process is repeated until the pipeline has been extended the desired length.

Although this method works well with a laser beam as a collimated light beam, it has been found that the laser beam bends slightly after a certain length of the smaller pipe has been laid, thereby causing misalignment of the pipes. Normally, this condition appears after about 200 feet of pipe has been laid. Although it is not known exactly why this occurs, it is believed that the gases from the pipe joint sealing compositions and other sources build up within the pipes and distort or refract the light beam.

It has been discovered that this distortion or refraction of the laser beam and other such collimated light beams can be reduced or eliminated by forcing air through the pipe during the pipe laying operation.

In a copending application entitled "Method and Apparatus for Laying a Pipeline" assigned to the present assignee and filed on Sept. 30, 1968, for Roger J. Roodvoets and Merlin J. Applegate, Ser. No. 763,786; there is described a method and apparatus for forcing air through a pipeline by clamping an air outlet nozzle coupled to a blower to the end of the end pipe to force air through the line. Although this system greatly improved the accuracy of the pipeline alignment, in relatively large diameter pipes or relatively long pipelines, alignment difficulties were still frequently encountered. Also in the system described in the above application, a relatively large blower unit was necessary to force sufficient air through the pipeline.

Thus while forcing sufficient air through a pipeline during installation of the line was discovered to solve the alignment errors due to refraction, the problem remained as to removing deleterious gases without requiring large and cumbersome blowers to force air by "brute force" through extensive lengths of pipeline, or through large diameter pipeline.

Extensive experimentation with nozzle shapes and finally nozzle angles resulted in successful operation with relatively small blowers when the outlet nozzle was clamped to the pipe at an angle to the longitudinal axis of the pipeline. Subsequent investigation revealed that by so aligning the outlet nozzle, air was forced through the pipeline in a helical spiral which provided excellent mixture of and removal of deleterious gases in the pipelines.

SUMMARY OF THE INVENTION

By forcing air through the pipe in a helical spiral, a relatively small blower unit can successfully be used for purging deleterious gases from relatively large (24 inches or greater) diameter pipes as well as relatively long sections of pipeline. The spiral streams of air currents present an air velocity profile across the pipe which is extremely efficient in mixing and removing deleterious gases since it has radial and axial velocity components.

Methods embodying the present invention include the projection of a collimated light beam along a preselected path, positioning successive sections of pipe in end-to-end alignment in surrounding relationship to the beam which projects along the interior of the pipes, positioning a target on the end pipe of the line while simultaneously forcing air through the pipeline in a helical spiral.

Apparatus embodying the present invention includes a blower unit, a nozzle including a clamp adapted to hold the nozzle to a pipe at an angle relative to the longitudinal axis of the pipe, and means coupling the blower output to the nozzle.

It is an object of this invention to provide an improved method and apparatus for laying pipes along a preselected path.

It is an additional object of this invention to prevent distortion or refraction of a collimated light beam which is projected through a pipeline being laid with the aid of the light beam by forcing air through the pipe in a helical spiral.

Other aspects, objects, and advantages of this invention will become apparent to those skilled in the art from a study of the following description together with the accompanying drawings.

DETAILED DESCRIPTION OF THE PREFERRED EMBODIMENT

Figure 1:
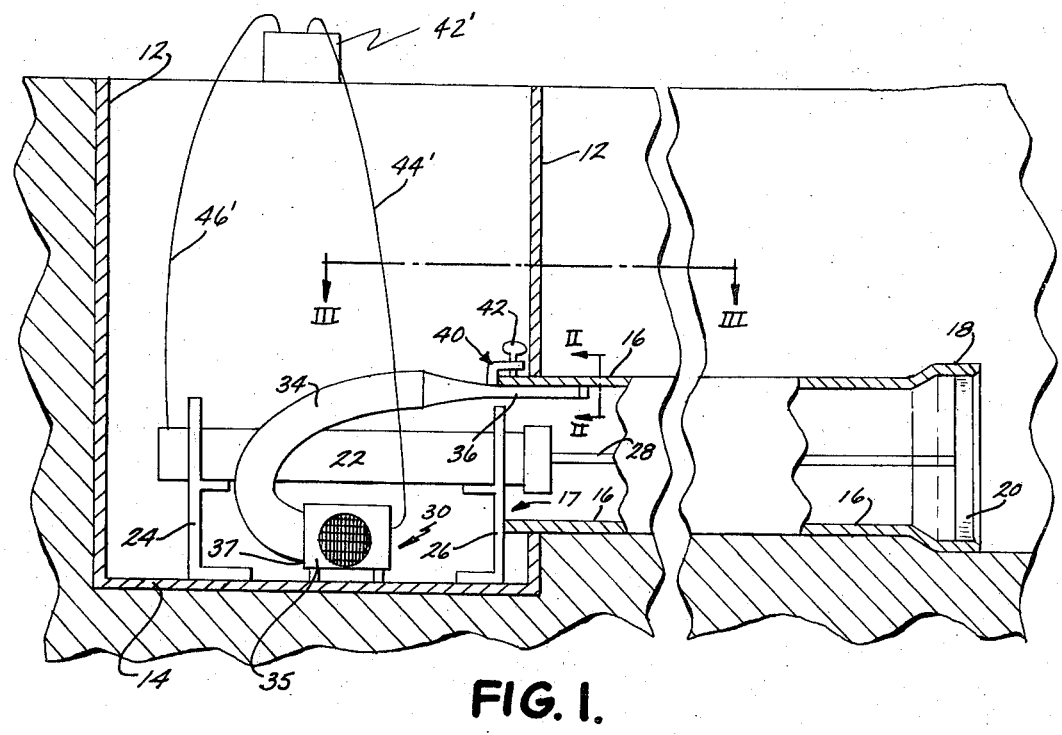
FIG. 1 is a cross-sectional view in schematic form of apparatus embodying the invention.

Referring now to the drawings, a pre-cast manhole 12, having a bottom 14 and a pipeline 16, has positioned therein a laser beam generator 22 within the bottom of the pre-cast manhole in a position such that a laser beam 28 from generator 22 is directed through the open end 17 of the pipe 16 communicating with manhole 12. The end pipe in the pipeline has a target 20 removably positioned within an enlarged end 18 of the end pipe. The target has a translucent screen for viewing the position of the laser beam 28 impinging on the target. The laser beam generator 22 is prealigned so that the laser beam 28 follows a desired predetermined path and the pipeline is laid within an excavated ditch according to the method disclosed and claimed in U. S. Pat. No. 3,116,557, which is incorporated herein by reference.

It has been found that when laying pipe according to the method of the above patent, the laser beam appears to bend after about 200 feet of pipe has been laid. It is believed that this bending of the laser beam is due to stagnant gases from the pipe material itself or from sealing compound employed to sections of pipe and which tend to accumulate within the pipeline. These gases are believed to refract the laser beam, thereby causing misalignment of the pipes within the pipeline and making accurate laying of the pipeline impossible.

Figure 2:
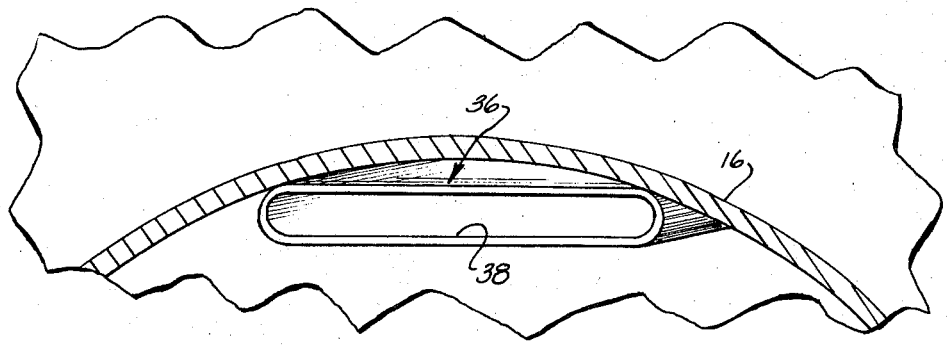
FIG. 2 is a cross-sectional view taken along lines II—II of FIG. 1.

According to the invention, the air within the pipeline is caused to flow spirally therethrough in order to prevent the accumulation of such gases within the pipeline. For this purpose, a blower unit 30 is employed to force air to flow through the pipeline in a spiral manner by means of a flexible tube 34 and a nozzle 36 having a flattened exit end 38 (FIG. 2). The blower has an air intake 35 and an outlet 37 which is connected to the flexible tube 34. The nozzle 36 is fixed at an angle $\alpha$ (FIG. 3) to the longitudinal axis 19 of the pipeline by means of a clamp 40 having a thumb screw 42 for attachment. A battery 42' supplies electric current to the blower 30 by means of a two-conductor power line 44'. The battery 42' can also be used to supply power to the laser beam generator 22 through a power line 46'.

Figure 3:
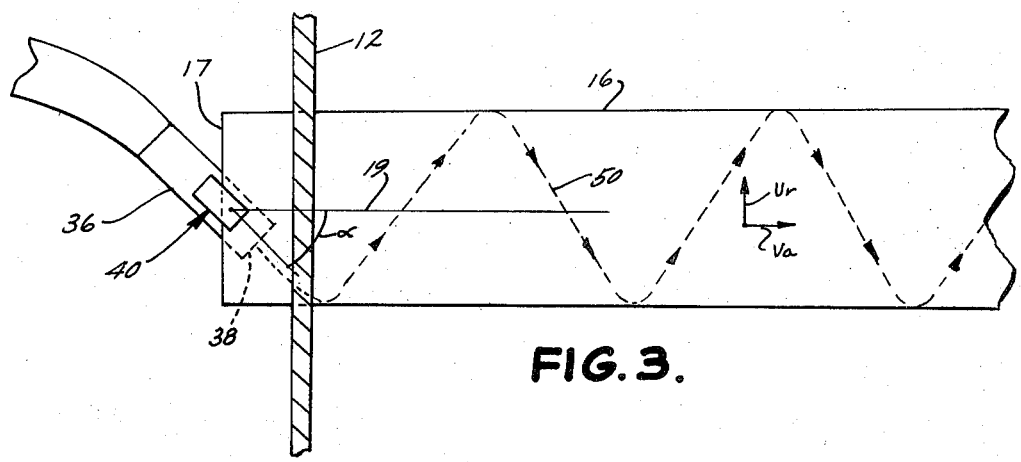
FIG. 3 is a plan view of the apparatus embodying the present invention partially shown in cross section and taken along lines III—III of FIG. 1.

The positioning of the open end 38 of the nozzle 36 at an angle $\alpha$ which can range between approximately 30° to 60° although 45° has proven most effective in forcing air through the pipeline in a helical spiral as indicated in FIG. 3 by the dashed line 50 which represents the trajectory a particle would traverse through the pipe if following the air stream from the nozzle 38. As used herein, the term helical spiral defines the three-dimensional twisting motion of air currents through the pipeline. It is understood that this air current motion is most pronounced at the periphery of the pipe where deleterious gases are emitted and diminishes toward the center of the pipe.

The mixing and purging action of the helical spiral current flow of air through the pipe is accomplished by virtue of the axial and radial components of the air velocity indicated by $V_a$ and $V_r$ on the vector diagram shown adjacent the trajectory 50 in FIG. 3. The component $V_a$ tends to force air out of the pipe whereas the component $V_r$ tends to mix the air in the pipe thereby insuring all the gases are purged from the pipeline 16.

Figure 4:
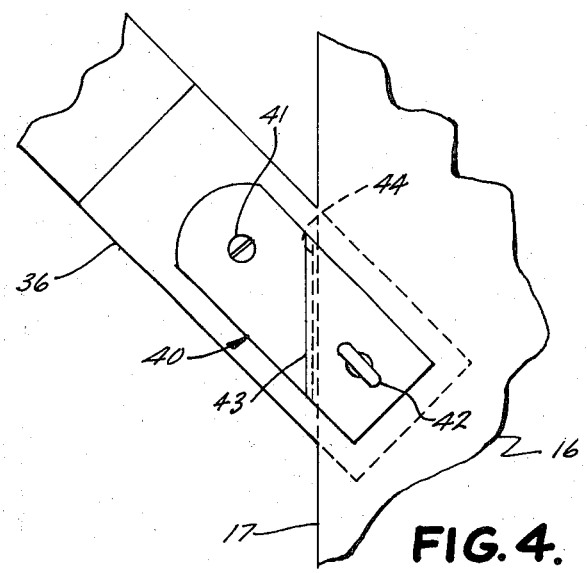
FIG. 4 is an enlarged detailed plan view of a clamp forming a portion of the apparatus embodying the present invention.
Figure 5:
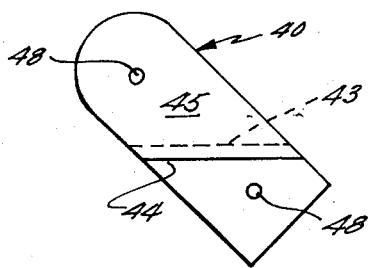
FIG. 5 is a detailed underside view of the clamp shown in plan view in FIG. 4.

Means are provided for positioning nozzle 36 in proximity with the inner surface of the pipeline and at an angle to the longitudinal axis of the pipeline. It is noted here that as seen in FIG. 2 the edge of the nozzle opening need not contact the inner wall of the pipeline since effective operation can be achieved if the nozzle is positioned relatively close (in proximity) to the inner wall. A clamp 40 which can be employed to fasten the nozzle 36 to the end 17 of the pipeline 16 at a desired angle $\alpha$ is shown in detail in FIGS. 4 and 5. The clamp 40 comprises a piece of material having right angle bends defining opposite surfaces 43 and 44 respectively of an intermediate section extending orthogonally to the opposite end segments of the clamp holding them in spaced planar relationship. The wall of pipe 16 fits between a lower surface 45 of the clamp and the outer surface of the nozzle 36. The clamp is attached to the nozzle 36 by means of a metal screw 41 or the like which can be loosened to adjust the angular position of the clamp 40 relative to the nozzle 36. In the figures, the clamp is shown with its longitudinal axis approximately aligned with the longitudinal axis of the nozzle.

The bends adjacent surfaces 43 and 44 extend across the clamp at approximately 45° to the longitudinal axis of the clamp such that the surface 44 can be placed adjacent the end surface 17 of the pipe 16 to serve as a guide for mounting the nozzle 36 at the desired angle relative to the pipe. The thumb screw 42 is threaded in a suitable threaded aperture 48 for securing the clamp to the pipe.

By adjusting the position of the clamp 40 on the nozzle 36, the clamp surface 44 can be made to abut the end surface 17 of the pipe 16 such that air exits the nozzle at any desirable angle. The range of approximately 30° to 60° has been effective in providing helical spiral flow of air for efficiently purging deleterious gases from a pipeline with an air flow of approximately 150 C.F.M. such that the laser beam 28 (FIG. 1) will not be refracted in its travel along the pipeline.

It will become apparent to those skilled in the art that various modifications of the apparatus embodying the present invention can be employed to provide the desired helical spiral of air current through the pipe. For example, the shape of the exit end of the nozzle can be modified as can the clamp provided to secure the nozzle to the pipe. These and other modifications of the present invention will become apparent to those skilled in the art but will fall within the scope of the present invention as defined by the appended claims.

What is claimed is:

1. A method of laying a plurality of pipe sections along a desired invert to form a string of pipe sections and for aligning each of said pipe sections such method including the steps of aligning each pipe by:

projecting a narrow collimated beam of light along said predetermined path parallel to said desired invert;

placing the pipe section in position such that said beam of light passes therethrough;

associating a target means in a predetermined position with respect to the exit end of said section of said pipe remote from the source position of said light;

aligning said pipe section by moving said target means and the exit end of said pipe section together in a direction transverse to said predetermined path to locate the impingement of said beam of light on said target at a position on said target such that the flow line of said pipe is parallel to and aligned in predetermined relationship with said path of said light beam and said invert;

fixing in place said section of pipe;

transferring said target to an exit end of each successive pipe section for repeating the above aligning steps on each successive pipe section;

repeating the above aligning steps on each successive pipe section; and forcing air through said pipe sections during said alignment steps in a helical spiral so as to prevent the gases in said pipe section from adversely affecting the accuracy of the alignment of said pipe.

2. The method defined in claim 1 in which a laser beam of light is projected along said path;

3. The method defined in claim 1 in which the air is forced through the pipe sections by blowing from the end of the string of pipe sections adjacent the source of the light beam.

4. The method defined in claim 1 in which the air is forced into the string of pipe adjacent the circumferential edge thereof and at an angle relative to the longitudinal axis of the pipe.

5. Apparatus for aligning a plurality of pipe sections along a predetermined invert to form a string of pipe sections, such apparatus comprising:

a light source for providing a narrow collimated beam of light adapted to be projected along a straight axis;

means for supporting said light source for projecting said beam of light through a section of pipe parallel to said invert;

a target means adapted to be associated in a predetermined position with respect to the exit end of said section of pipe, said target means being movable together with the exit end of the pipe section with which it is associated and said target means being transferrable from one end of one pipe section to another so as to be associable in said predetermined position with respect to each section of pipe;

the improvement comprising:

air moving means adapted to be associated with a string of said pipe sections for moving air through said string of pipe sections in a helical spiral;

said air moving means having the capacity to move sufficient gases in said pipe so as to prevent the gases from adversely affecting the position of said light beam within a string of pipe.

6. The apparatus as defined in claim 5 in which the light source is a laser beam generator.

7. The apparatus as defined in claim 5 in which the means for moving air is a blower means having a flexible tube connected thereto; and means on the end of said tube for clamping it to the string of pipe in communication with the inside thereof.

8. The apparatus as defined in claim 7 in which a nozzle is coupled to said end of said tube which is adapted to be clamped to said string of pipe and said clamping means is adapted to clamp said nozzle at an angle relative to the longitudinal axis of the string of pipe.

9. The apparatus as defined in claim 8 wherein said clamping means comprises a clamp including a first segment adapted to be attached to a nozzle, a second segment adapted to be attached to a pipe and an intermediate segment coupling said first and second segments in spaced planar relationship and defining an orthogonal surface extending at an acute angle to the longitudinal axis of said first and second segments to abut against the end of a pipe such that said nozzle projects into the end of the pipe at an acute angle to the longitudinal axis of the pipe.

10. Apparatus for projecting a stream of air from a blower through a pipeline in a helical spiral trajectory to reduce or eliminate errors in alignment of successive sections of pipe caused by refraction of an aligning beam of light due to stagnant gases within the pipeline of said apparatus comprising a nozzle having an input end and an exit end, means for coupling a source of forced air to said input end of said nozzle, and means for positioning said exit end of said nozzle in proximity to an inner surface of the pipeline and fixed at an angle relative to the longitudinal axis of the pipeline to project forced air from said nozzle through said pipeline in a helical spiral.

11. The apparatus as defined in claim 10 wherein said positioning means comprises a clamp for holding said nozzle to the inside surface of a pipeline by positioning the wall of the pipeline between said clamp said said nozzle, said clamp including a first segment adapted to be attached to a nozzle, a second segment adapted to be attached to a pipe and an intermediate segment coupling said first and second segments in spaced planar relationship and defining an orthogonal surface extending at an acute angle to the longitudinal axis of said first and second segments to abut against the end of a pipe such that said nozzle projects into the end of the pipe at an acute angle to the longitudinal axis of the pipe.

12. The apparatus as defined in claim 11 wherein said first segment of said clamp is adjustably attached to said nozzle for varying the angle between the direction of air from said nozzle relative to the longitudinal axis of said pipeline.

13. The apparatus as defined in claim 12 wherein said means for coupling a source of forced air to said input end of said nozzle comprises a flexible tube having one end coupled to said input end of said nozzle and an opposite end coupled to a blower for providing forced air to said nozzle.

14. The apparatus as defined in claim 10 in combination with a blower having the capacity to provide sufficient forced air to exhaust deleterious gases from the pipeline and a flexible tube coupling an air outlet of said blower to said input end of said nozzle.

* * * * *